(12) United States Patent
Watanabe et al.

(10) Patent No.: US 7,739,420 B2
(45) Date of Patent: Jun. 15, 2010

(54) COMMUNICATION ERROR INFORMATION OUTPUT METHOD, COMMUNICATION ERROR INFORMATION OUTPUT DEVICE AND RECORDING MEDIUM THEREFOR

(75) Inventors: Yukihiro Watanabe, Kawasaki (JP); Hiroyuki Yamashima, Kawasaki (JP); Tetsuya Okano, Kawasaki (JP); Kenji Morimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 348 days.

(21) Appl. No.: 12/017,864

(22) Filed: Jan. 22, 2008

(65) Prior Publication Data
US 2008/0177901 A1 Jul. 24, 2008

(30) Foreign Application Priority Data
Jan. 24, 2007 (JP) .............................. 2007-013864

(51) Int. Cl.
*G06F 3/00* (2006.01)
(52) U.S. Cl. ............................... 710/19; 710/7; 710/15; 714/18; 714/20; 714/45; 714/57
(58) Field of Classification Search ........................ None
See application file for complete search history.

(56) References Cited

U.S. PATENT DOCUMENTS 5,047,977 A * 9/1991 Hill et al. ....................... 714/57

2001/0042119 A1 * 11/2001 Urano et al. ................. 709/223

FOREIGN PATENT DOCUMENTS

JP 5-30150 2/1993

OTHER PUBLICATIONS

Ferguson et al., Error Log Analysis, Nov. 1, 1980, IBM Technical Disclosure Bulletin, pp. 1-13.*

* cited by examiner

*Primary Examiner*—Eron J Sorrell
(74) *Attorney, Agent, or Firm*—Staas & Halsey LLP

(57) ABSTRACT

A method and device of outputting information related to a communication error including obtaining a communication log containing a communication message delivered between a second device and a third device in accordance with a control message transmitted from a first device to the second device. A non-transmitted control message specifying procedure reading out control message association information containing identification information of a control message delivered between the second device and the third device in association with a control message addressed and transmitted from the first device to the second device, and specifying a non-transmitted control message based on the read-out control message association information and the communication log.

10 Claims, 15 Drawing Sheets

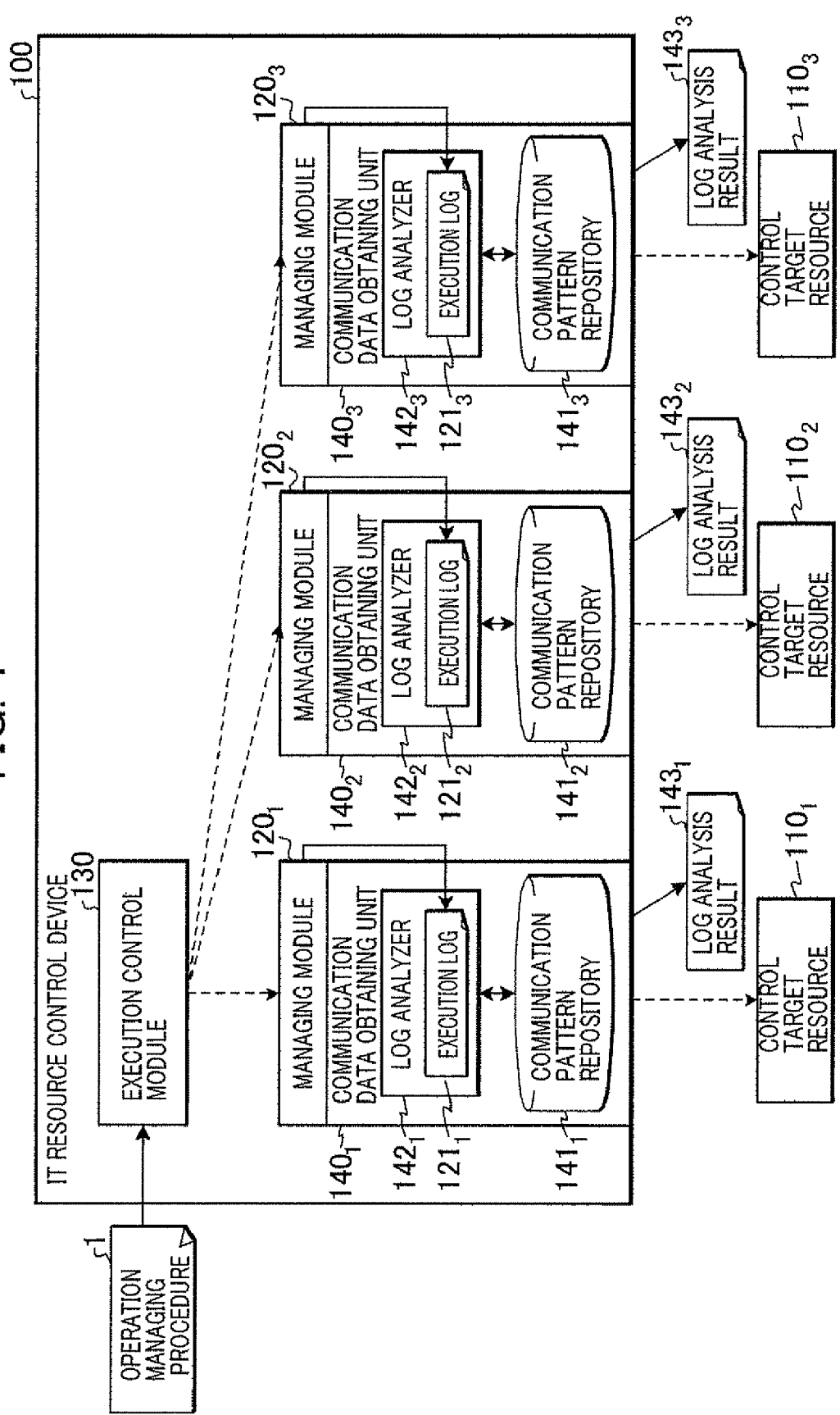

FIG. 2A

EXECUTION LOG OUTPUT FROM MANAGING MODULE A

| No. | TIME | SESSION | TRANSMISSION SOURCE | DESTINATION | PROTOCOL | CONTROL CONTENT | PARAMETER |
|---|---|---|---|---|---|---|---|
| 1 | 2005/11/23 10:20:14.905 | SS1 | EXECUTION CONTROL MODULE | MANAGING MODULE A | HTTP_SOAP | COMMAND | "DO_CHANGE_CONFIG" |
| 2 | 2005/11/23 10:20:15.117 | SS1 | MANAGING MODULE A | CONTROL TARGET | SSH | REQUEST_LOGIN | "web_001" |
| 3 | 2005/11/23 10:20:15.814 | SS1 | CONTROL TARGET | MANAGING MODULE A | SSH | PROMPT | "password:" |
| 4 | 2005/11/23 10:20:16.144 | SS1 | MANAGING MODULE A | CONTROL TARGET | SSH | INPUT_TERMINAL | "******" |
| 5 | 2005/11/23 10:20:16.358 | SS1 | CONTROL TARGET | MANAGING MODULE A | SSH | PROMPT | "¥[web_001¥].*¥$" |
| 6 | 2005/11/23 10:20:16.473 | SS1 | MANAGING MODULE A | CONTROL TARGET | SSH | INPUT_TERMINAL | "passwd ! someuser" |
| 7 | 2005/11/23 10:20:17.212 | SS1 | CONTROL TARGET | MANAGING MODULE A | SSH | SHUTDOWN_SESSION | |
| 8 | 2005/11/23 10:20:17.212 | SS1 | MANAGING MODULE A | EXECUTION CONTROL MODULE | HTTP_SOAP | RESPONSE | "COMMANDFAILED" |

FIG. 2B

EXECUTION LOG OUTPUT FROM MANAGING MODULE B

| No. | TIME | SESSION | TRANSMISSION SOURCE | DESTINATION | PROTOCOL | CONTROL CONTENT | PARAMETER |
|---|---|---|---|---|---|---|---|
| 1 | 2005/11/23 10:20:11.254 | SS2 | EXECUTION CONTROL MODULE | MANAGING MODULE B | HTTP_SOAP | COMMAND | "DO_SHUTDOWN" |
| 2 | 2005/11/23 10:20:11.452 | SS2 | MANAGING MODULE B | CONTROL TARGET | SSH | REQUEST_LOGIN | "web_001" |
| 3 | 2005/11/23 10:20:12.576 | SS2 | CONTROL TARGET | MANAGING MODULE B | SSH | PROMPT | "password:" |
| 4 | 2005/11/23 10:20:12.661 | SS2 | MANAGING MODULE B | CONTROL TARGET | SSH | INPUT_TERMINAL | "******" |
| 5 | 2005/11/23 10:20:13.212 | SS2 | CONTROL TARGET | MANAGING MODULE B | SSH | PROMPT | "¥[web_001¥].*¥$" |
| 6 | 2005/11/23 10:20:13.374 | SS2 | MANAGING MODULE B | CONTROL TARGET | SSH | INPUT_TERMINAL | "shutdown  r  f now" |
| 7 | 2005/11/23 10:20:13.212 | SS2 | CONTROL TARGET | MANAGING MODULE B | SSH | PROMPT | "¥r¥n" |
| 8 | 2005/11/23 10:20:20.584 | SS2 | MANAGING MODULE B | CONTROL TARGET | SSH | SHUTDOWN_SESSION | |
| 9 | 2005/11/23 10:20:20.802 | SS2 | MANAGING MODULE B | EXECUTION CONTROL MODULE | HTTP_SOAP | RESPONSE | "COMMAND SUCCESSED" |

FIG. 3A

COMMUNICATION PATTERN REPOSITORY OF MANAGING MODULE A

| No. | TRANSMISSION SOURCE | DESTINATION | PROTOCOL | CONTROL CONTENT | PARAMETER |
|---|---|---|---|---|---|
| 1 | EXECUTION CONTROL MODULE | MANAGING MODULE A | HTTP_SOAP | COMMAND | "DO_CHANGE_CONFIG" |
| 2 | MANAGING MODULE A | CONTROL TARGET | SSH | REQUEST_LOGIN | "web_001" |
| 3 | CONTROL TARGET | MANAGING MODULE A | SSH | PROMPT | "passeord:",delta(3,2)<10 |
| 4 | MANAGING MODULE A | CONTROL TARGET | SSH | INPUT_TERMINAL | "*******" |
| 5 | CONTROL TARGET | MANAGING MODULE A | SSH | PROMPT | "¥[web_001¥].*¥$",delta(5,4)<10 |
| 6 | MANAGING MODULE A | CONTROL TARGET | SSH | INPUT_TERMINAL | "passeord-l someuser" |
| 7 | CONTROL TARGET | MANAGING MODULE A | SSH | PROMPT | "¥r¥n",delta(7,6)<10 |
| 8 | MANAGING MODULE A | CONTROL TARGET | SSH | INPUT_TERMINAL | "exit" |
| 9 | CONTROL TARGET | MANAGING MODULE A | SSH | PROMPT | "¥r¥n",delta(9,8)<10 |
| 10 | CONTROL TARGET | MANAGING MODULE A | SSH | SHUTDOWN_SESSION | delta(10,9)<10 |
| 11 | MANAGING MODULE A | EXECUTION CONTROL MODULE | HTTP_SOAP | RESPONSE | "COMMAND SUCCESSED",delta(11,1)<120 |

FIG. 3B

COMMUNICATION PATTERN REPOSITORY OF MANAGING MODULE B

| No. | TRANSMISSION SOURCE | DESTINATION | PROTOCOL | CONTROL CONTENT | CONDITION |
|---|---|---|---|---|---|
| 1 | EXECUTION CONTROL MODULE | MANAGING MODULE B | HTTP_SOAP | COMMAND | "DO_SHUTDOWN" |
| 2 | MANAGING MODULE B | CONTROL TARGET | SSH | REQUEST_LOGIN | "web_001" |
| 3 | CONTROL TARGET | MANAGING MODULE B | SSH | PROMPT | "passeord:",delta(3,2)<10 |
| 4 | MANAGING MODULE B | CONTROL TARGET | SSH | INPUT_TERMINAL | "*******" |
| 5 | CONTROL TARGET | MANAGING MODULE B | SSH | PROMPT | "¥[web_001¥].*¥$",delta(5,4)<10 |
| 6 | MANAGING MODULE B | CONTROL TARGET | SSH | PROMPT | "shutdown-r-f now" |
| 7 | CONTROL TARGET | MANAGING MODULE B | SSH | PROMPT | "¥r¥n",delta(7,6)<10 |
| 8 | CONTROL TARGET | MANAGING MODULE B | SSH | SHUTDOWN_SESSION | delta(8,7)<60 |
| 9 | MANAGING MODULE B | EXECUTION CONTROL MODULE | HTTP_SOAP | RESPONSE | "COMMAND SUCCESSED",delta(8,1)<120 |

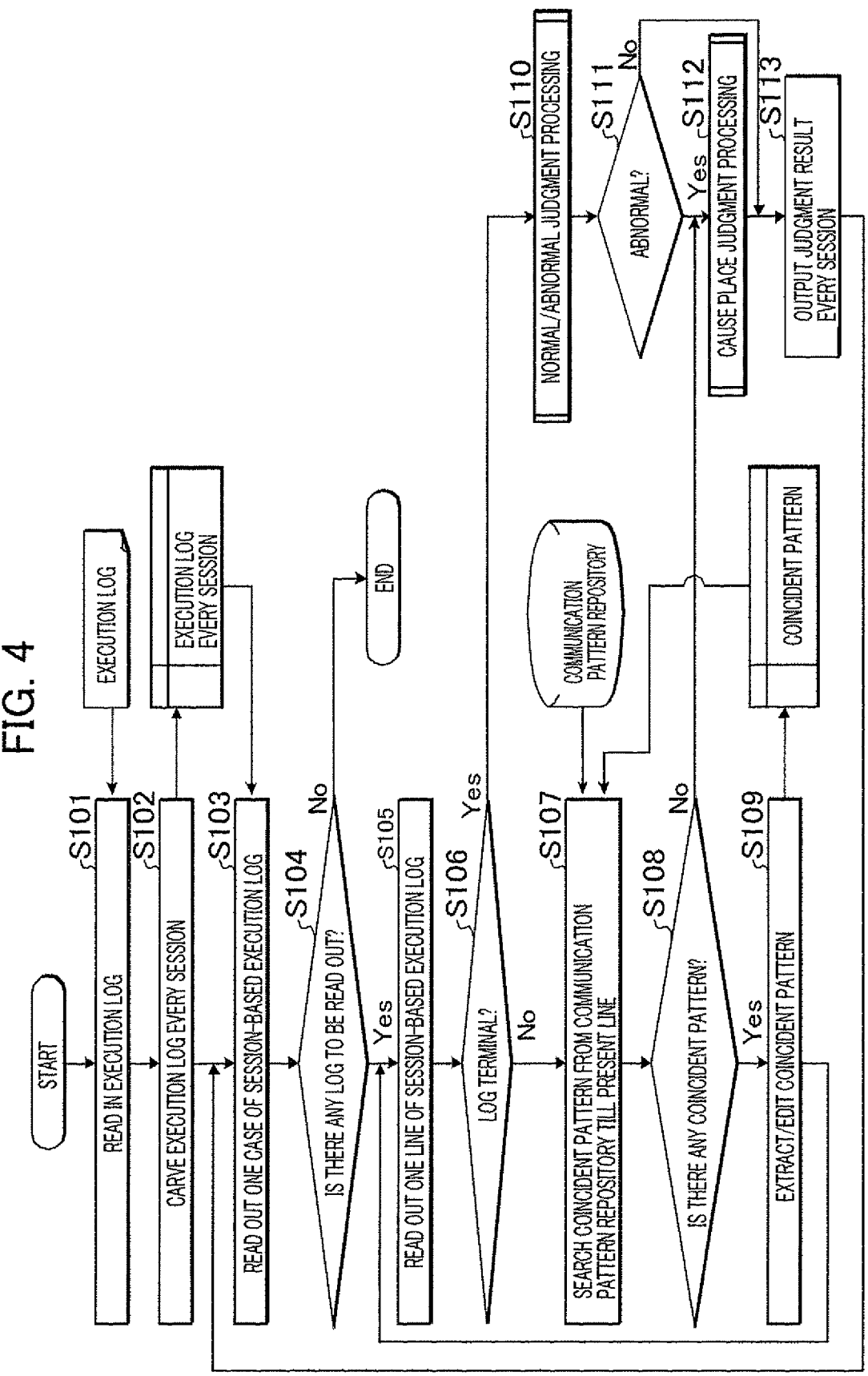

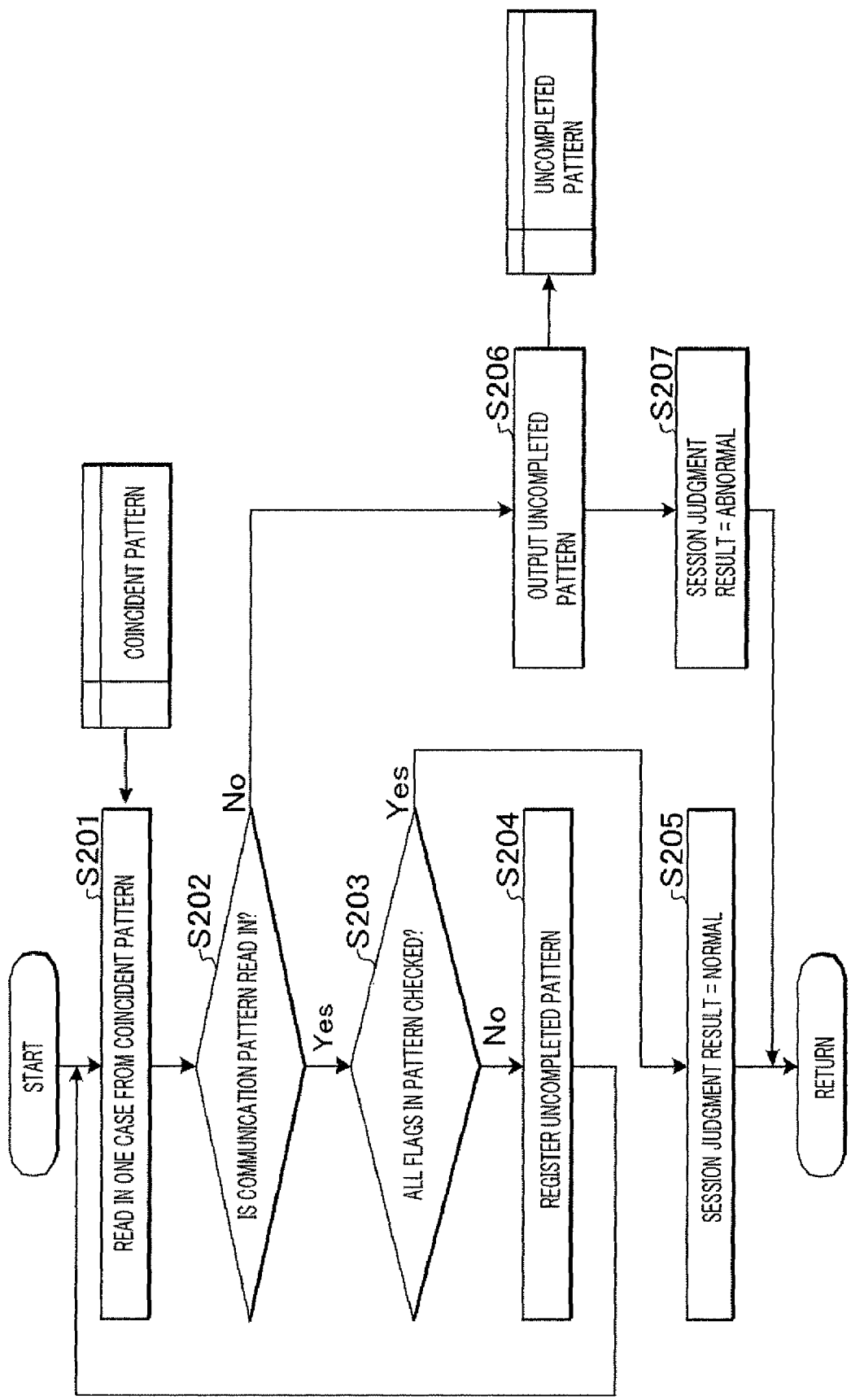

FIG. 8A

| No. | TRANSMISSION SOURCE | DESTINATION | PROTOCOL | CONTROL CONTENT | PARAMETER | RESTRICTION AND INFLUENCE TO OTHER PROCESS |
|---|---|---|---|---|---|---|
| 1 | EXECUTION CONTROL MODULE | MANAGING MODULE B | HTTP_SOAP | COMMAND | "DO_SHUTDOWN" | EXCLUSION INDISPENSABLE |
| 2 | MANAGING MODULE B | CONTROL TARGET | SSH | REQUEST_LOGIN | | |
| 3 | CONTROL TARGET | MANAGING MODULE B | SSH | PROMPT | "web_001" | |
| 4 | MANAGING MODULE B | CONTROL TARGET | SSH | INPUT_TERMINAL | "password:", delta(3,2)<10 | |
| 5 | CONTROL TARGET | MANAGING MODULE B | SSH | PROMPT | "******" | |
| 6 | MANAGING MODULE B | CONTROL TARGET | SSH | INPUT_TERMINAL | "¥[web_001¥].*¥$", delta(5,4)<10 | OTHER PROCESSES USING RESOURCE CONCERNED FORCEDLY FAIL |
| 7 | CONTROL TARGET | MANAGING MODULE B | SSH | PROMPT | "¥r¥n", delta(7,6)<10 | |
| 8 | CONTROL TARGET | MANAGING MODULE B | SSH | SHUTDOWN_SESSION | Delta(8,7)<60 | |
| 9 | MANAGING MODULE B | EXECUTION CONTROL MODULE | HTTP_SOAP | RESPONSE | "COMMAND SUCCESSED" Delta(8,1)<120 | |

FIG. 8B

| No. | TRANSMISSION SOURCE | DESTINATION | PROTOCOL | CONTROL CONTENT | PARAMETER | |
|---|---|---|---|---|---|---|
| 1 | EXECUTION CONTROL MODULE | MANAGING MODULE A | HTTP_SOAP | COMMAND | "DO_CHANGE_CONFIG" | |
| 2 | MANAGING MODULE A | CONTROL TARGET | SSH | REQUEST_LOGIN | | |
| 3 | CONTROL TARGET | MANAGING MODULE A | SSH | PROMPT | "web_001" | |
| 4 | MANAGING MODULE A | CONTROL TARGET | SSH | INPUT_TERMINAL | "password:", delta(3,2)<10 | |
| 5 | CONTROL TARGET | MANAGING MODULE A | SSH | PROMPT | "******" | |
| 6 | MANAGING MODULE A | CONTROL TARGET | SSH | INPUT_TERMINAL | "¥[web_001¥].*¥$", delta(5,4)<10 | FAIL WHILE TARGET USER LOGS IN |
| 7 | CONTROL TARGET | MANAGING MODULE A | SSH | PROMPT | "¥r¥n", delta(7,6)<10 | |
| 8 | MANAGING MODULE A | CONTROL TARGET | SSH | INPUT_TERMINAL | "passwd -l someuser" | |
| 9 | CONTROL TARGET | MANAGING MODULE A | SSH | PROMPT | "¥r¥n", delta(9,8)<10 | |
| 10 | CONTROL TARGET | MANAGING MODULE A | SSH | INPUT_TERMINAL | "exit" | |
| 11 | MANAGING MODULE A | EXECUTION CONTROL MODULE | HTTP_SOAP | RESPONSE | "¥r¥n", delta(10,9)<10 "COMMAND SUCCESSED" Delta(11,1)<120 | |

FIG. 9

| No. | TIME | SESSION | TRANSMISSION SOURCE | DESTINATION | PROTOCOL | CONTROL CONTENT | PARAMETER |
|---|---|---|---|---|---|---|---|
| 1 | 2005/11/23 10:20:11.254 | SS2 | EXECUTION CONTROL MODULE | MANAGING MODULE B | HTTP_SOAP | COMMAND | "DO_SHUTDOWN" |
| 2 | 2005/11/23 10:20:11.452 | SS2 | MANAGING MODULE B | CONTROL TARGET | SSH | REQUEST_LOGIN | "web_001" |
| 3 | 2005/11/23 10:20:12.576 | SS2 | CONTROL TARGET | MANAGING MODULE B | SSH | PROMPT | "passeord:" |
| 4 | 2005/11/23 10:20:12.661 | SS2 | MANAGING MODULE B | CONTROL TARGET | SSH | INPUT_TERMINAL | "******" |
| 5 | 2005/11/23 10:20:13.212 | SS2 | CONTROL TARGET | MANAGING MODULE B | SSH | PROMPT | "¥[web_001¥].*¥$" |
| 6 | 2005/11/23 10:20:13.374 | SS2 | MANAGING MODULE B | CONTROL TARGET | SSH | INPUT_TERMINAL | "shutdown -r -f now" |
| 7 | 2005/11/23 10:20:13.212 | SS2 | CONTROL TARGET | MANAGING MODULE B | SSH | PROMPT | "¥r¥n" |
| 8 | 2005/11/23 10:20:14.905 | SS1 | EXECUTION CONTROL MODULE | MANAGING MODULE A | HTTP_SOAP | COMMAND | "DO_CHANGE_CONFIG" |
| 9 | 2005/11/23 10:20:15.117 | SS1 | MANAGING MODULE A | CONTROL TARGET | SSH | REQUEST_LOGIN | "web_001" |
| 10 | 2005/11/23 10:20:15.814 | SS1 | CONTROL TARGET | MANAGING MODULE A | SSH | PROMPT | "passeord:" |
| 11 | 2005/11/23 10:20:16.144 | SS1 | MANAGING MODULE A | CONTROL TARGET | SSH | INPUT_TERMINAL | "******" |
| 12 | 2005/11/23 10:20:16.358 | SS1 | CONTROL TARGET | MANAGING MODULE A | SSH | PROMPT | "¥[web_001¥].*¥$" |
| 13 | 2005/11/23 10:20:16.473 | SS1 | MANAGING MODULE A | CONTROL TARGET | SSH | INPUT_TERMINAL | "passwd -l someuser" |
| 14 | 2005/11/23 10:20:17.212 | SS1 | CONTROL TARGET | MANAGING MODULE A | SSH | SHUTDOWN_SESSION | |
| 15 | 2005/11/23 10:20:17.212 | SS1 | MANAGING MODULE A | EXECUTION CONTROL MODULE | HTTP_SOAP | RESPONSE | "COMMANDFAILED" |
| 16 | 2005/11/23 10:20:20.584 | SS2 | CONTROL TARGET | MANAGING MODULE B | SSH | SHUTDOWN_SESSION | |
| 17 | 2005/11/23 10:20:20.802 | SS2 | MANAGING MODULE B | EXECUTION CONTROL MODULE | HTTP_SOAP | RESPONSE | "COMMAND SUCCESSED" |

FIG. 12A

| No. | TIME | TRANSMISSION SOURCE | DESTINATION | PROTOCOL | CONTROL CONTENT | PARAMETER |
|---|---|---|---|---|---|---|
| 1 | 2005/11/23 10:20:11.254 | EXECUTION CONTROL MODULE | MANAGING MODULE B | HTTP_SOAP | COMMAND | "DO_SHUTDOWN" |
| 2 | 2005/11/23 10:20:11.452 | MANAGING MODULE B | CONTROL TARGET | SSH | REQUEST_LOGIN | "web_001" |
| 3 | 2005/11/23 10:20:12.576 | CONTROL TARGET | MANAGING MODULE B | SSH | PROMPT | "password:" |
| 4 | 2005/11/23 10:20:12.661 | MANAGING MODULE B | CONTROL TARGET | SSH | INPUT_TERMINAL | "*******" |
| 5 | 2005/11/23 10:20:13.212 | CONTROL TARGET | MANAGING MODULE B | SSH | PROMPT | "¥[web_001¥].*¥$" |
| 6 | 2005/11/23 10:20:13.374 | MANAGING MODULE B | CONTROL TARGET | SSH | INPUT_TERMINAL | "shutdown  r  f now" |
| 7 | 2005/11/23 10:20:13.212 | CONTROL TARGET | MANAGING MODULE B | SSH | PROMPT | "¥r¥n" |
| 8 | 2005/11/23 10:20:14.905 | EXECUTION CONTROL MODULE | MANAGING MODULE A | HTTP_SOAP | COMMAND | "DO_CHANGE_CONFIG" |
| 9 | 2005/11/23 10:20:15.117 | MANAGING MODULE A | CONTROL TARGET | SSH | REQUEST_LOGIN | "web_001" |
| 10 | 2005/11/23 10:20:15.814 | CONTROL TARGET | MANAGING MODULE A | SSH | PROMPT | "password:" |
| 11 | 2005/11/23 10:20:16.144 | MANAGING MODULE A | CONTROL TARGET | SSH | INPUT_TERMINAL | "*******" |
| 12 | 2005/11/23 10:20:16.358 | CONTROL TARGET | MANAGING MODULE A | SSH | PROMPT | "¥[web_001¥].*¥$" |
| 13 | 2005/11/23 10:20:16.473 | MANAGING MODULE A | CONTROL TARGET | SSH | INPUT_TERMINAL | "passwd  l someuser" |
| 14 | 2005/11/23 10:20:17.212 | CONTROL TARGET | MANAGING MODULE A | SSH | SHUTDOWN_SESSION | |
| 15 | 2005/11/23 10:20:17.212 | MANAGING MODULE A | EXECUTION CONTROL MODULE | HTTP_SOAP | RESPONSE | "COMMAND FAILED" |
| 16 | 2005/11/23 10:20:20.584 | MANAGING MODULE B | CONTROL TARGET | SSH | SHUTDOWN_SESSION | |

FIG. 12B

| No. | TRANSMISSION SOURCE | DESTINATION | PROTOCOL | CONTROL CONTENT | PARAMETER | RESTRICTION AND INFLUENCE ON OTHER PROCESSES |
|---|---|---|---|---|---|---|
| 1 | EXECUTION CONTROL MODULE | MANAGING MODULE B | HTTP_SOAP | COMMAND | "DO_SHUTDOWN" | EXCLUSIVE INPUT INDISPENSABLE |
| 2 | MANAGING MODULE B | CONTROL TARGET | SSH | REQUEST_LOGIN | "web_001" | |
| 3 | CONTROL TARGET | MANAGING MODULE B | SSH | PROMPT | "passord:", delta(3,2)×10 | |
| 4 | MANAGING MODULE B | CONTROL TARGET | SSH | INPUT_TERMINAL | "******" | |
| 5 | CONTROL TARGET | MANAGING MODULE B | SSH | PROMPT | "¥[web_001¥].*¥$", delta(5,4)×10 | |
| 6 | MANAGING MODULE B | CONTROL TARGET | SSH | INPUT_TERMINAL | "shutdown  r  f now" | OTHER PROCESSES USING RESOURCE CONCERNED FORCEDLY FAIL |
| 7 | CONTROL TARGET | MANAGING MODULE B | SSH | PROMPT | "¥r¥n", delta(7,6)×10 | |
| 8 | MANAGING MODULE B | CONTROL TARGET | SSH | SHUTDOWN_SESSION | Delta(8,7)×60 | |
| 9 | MANAGING MODULE B | EXECUTION CONTROL MODULE | HTTP_SOAP | RESPONSE | "COMMAND SUCCESSED" Delta(8,1)×120 | |

COMMUNICATION ERROR INFORMATION OUTPUT METHOD, COMMUNICATION ERROR INFORMATION OUTPUT DEVICE AND RECORDING MEDIUM THEREFOR

CROSS-REFERENCE TO RELATED APPLICATIONS

This application is related to and claims the benefit of priority from the prior Japanese Patent Application No. 2007-13864, filed on Jan. 24, 2007, the entire contents of which are incorporated herein by reference.

BACKGROUND

1. Field

The present invention relates to a communication error information output program, method and device that output information associated with a communication error occurring in a communication carried out between a first device and a second device or a communication carried out between the second device and a third device in an information processing system in which the first device controls the third device through the second device.

2. Description of the Related Art

Work associated with operations such as management of an IT system has been hitherto mainly performed by a human's work of SE (System Engineer), an operator or the like. However, large-scale design and complication of IT systems have been recently promoted, and thus the operation management based on the human's work has shown limitations. Therefore, a method called as "autonomic operation" has been proposed as a method of solving the above described and other problems associated with operation management.

SUMMARY

The disclosed communication information output device and method output information associated with a communication error occurring in a communication executed between a first device and a second device or a communication executed between the second device and a third device in an information processing system in which the first device controls the third device through the second device. The method and device include a communication log obtaining operation (unit) obtaining a communication log containing a communication message which is communicated between the second device and the third device in accordance with a control message transmitted from the first device to the second device, a non-transmitted control message specifying operation (unit) reading out a control-message association information containing identification information of a control message communicated between the second device and the third device in association the control message transmitted from the first device to the second device while addressing the second device.

The disclosed method and device include specifying a non-transmitted control message based on the read-out control-message association information and the communication log obtained in the communication log obtaining operation (unit) and implementing a control message information output operation (unit) outputting information associated with the non-transmitted control message specified in the non-transmitted control message specifying operation (unit).

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 1 is a diagram illustrating a summary and construction of an IT resource control device;

FIGS. 2A and 2B are diagrams illustrating an example of an execution log output from a managing module;

FIGS. 3A and 3B are diagrams illustrating an example of a communication pattern repository;

FIG. 4 is a flowchart illustrating a processing flow of a log analyzer;

FIG. 5 is a flowchart illustrating a processing flow of normal/abnormal judgment processing shown in FIG. 4;

FIGS. 8A and 8B are diagrams illustrating an example of a coupling communication pattern repository;

FIG. 9 is a diagram illustrating an example of a coupling log;

FIGS. 12A and B are diagrams illustrating an example of causing place specifying processing based on dependency relation;

DETAILED DESCRIPTION OF THE PREFERRED EMBODIMENTS

Figure 6:
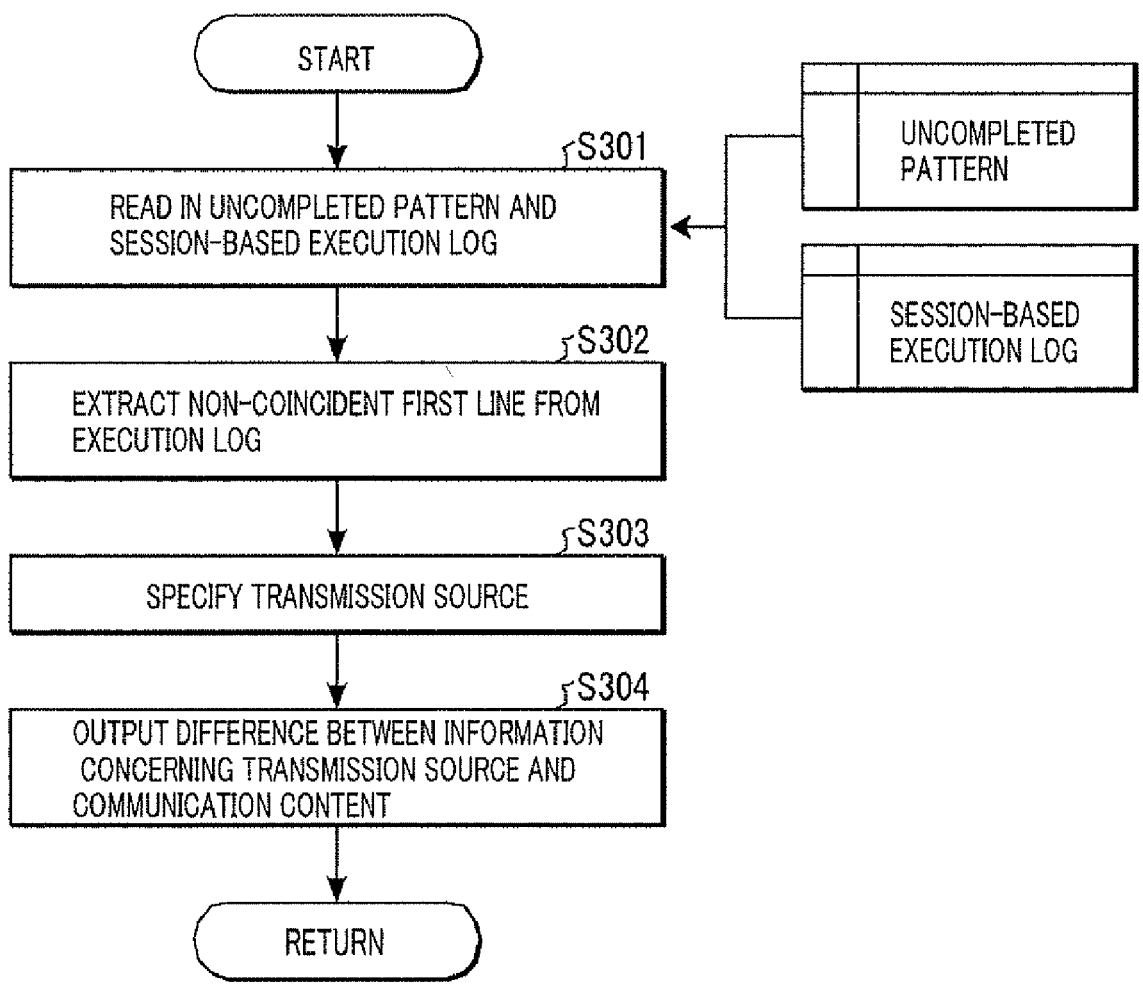
FIG. 6 is a flowchart illustrating a processing flow of causing place identifying processing shown in FIG. 4.

Reference will now be made in detail to the embodiments, examples of which are illustrated in the accompanying drawings, wherein like reference numerals refer to the like elements throughout. The embodiments are described below to explain the present invention by referring to the figures.

Figure 14:
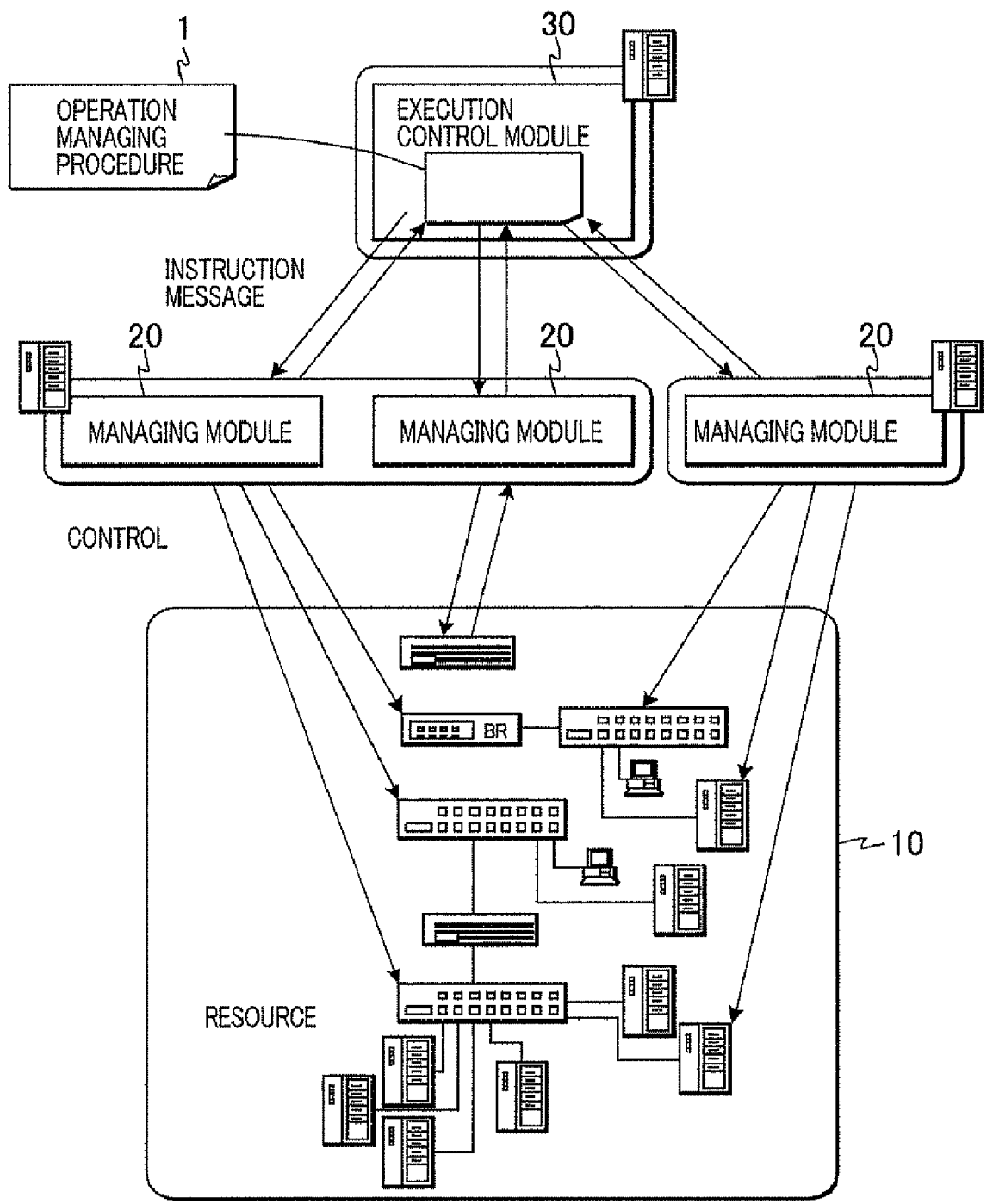
FIG. 14 is a diagram illustrating autonomic operation in a typical IT system.

FIG. 14 is a diagram showing an autonomic operation of a typical IT system. When the autonomic operation is carried out, the IT system is implemented with managing modules 20 for managing a resource 10 constituting the IT system and an execution control module 30 for controlling the managing modules 20 as shown in FIG. 14.

The managing modules 20 transmit various kinds of control messages to the resource 10 to obtain information and renew settings. The execution control module 30 transmits various kinds of control messages to the managing modules 20 based on an operation managing procedure 1 defining a procedure of the operation management so that plural managing modules 20 are operated in cooperation with one another. In the following description, the control message transmitted from the managing module 20 is referred to as "instruction message".

In the autonomic operation of the IT system described above, the managing module 20 autonomically executes the processing based on the instruction message transmitted from the execution control module 30, and returns the processing result to the execution control module 30 as a response. Therefore, the execution control module 30 cannot check an operation of the managing modules 20 in detail, and this is problematic in autonomic operation. This problem will be described hereunder by referring to some examples.

Figure 15:
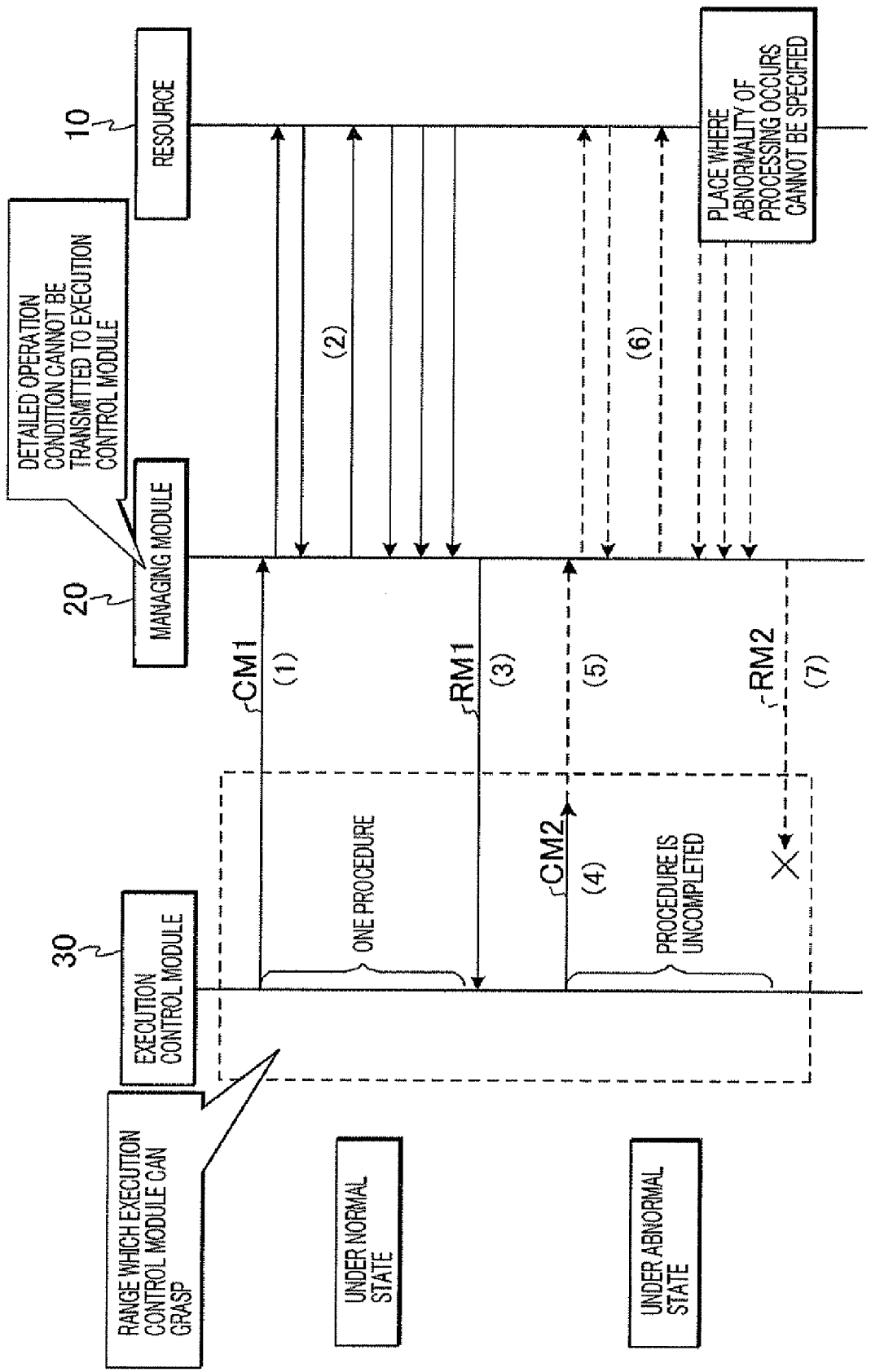
FIG. 15 is a diagram illustrating a problem of an autonomic operation in the typical IT system.

FIG. 15 is a diagram showing a problem of the autonomic operation in the typical IT system. As shown in FIG. 15, it is assumed that the execution control module 30 transmits an instruction message CM1 to the managing module 20 based on one procedure defined by the operation managing procedure 1 (see (1) of FIG. 15).

When receiving the instruction message CM1, the managing module 20 executes a predetermined processing of transmission/reception of packets to/from the resource 10 based on the content of the instruction message CM1 (see (2) of FIG. 15), and transmits a response message RM1 to the execution control module 30 when the processing is normally completed (see (3) of FIG. 15).

On the other hand, it is assumed that the execution control module 30 transmits an instruction message CM2 to the managing module 20 (see (4) of FIG. 15), but no response message RM2 is transmitted from the managing module 20 in response to the instruction message CM2.

In this case, it may be considered that no response message RM2 is transmitted for the following causes, etc. The control message CM2 transmitted from the execution control module 30 did not reach the managing module 20 (see (5) of FIG. 15), the delivery of the control message between the managing module 20 and the resource 10 is not normally completed (see (6) of FIG. 15), the response message RM2 is transmitted from the managing module 20, however, the response message RM2 did not reach the execution control module 30 for some reason (see (7) of FIG. 15).

However, the execution control module 30 cannot specify whether a communication error is caused in a place between the execution control module 30 and the managing module 20 and/or a place between the managing module 20 and the resource 10.

As a countermeasure to this problem, the managing module 20 is improved so as to inform the execution control module 30 of a status or an occurrence of an abnormality of transmission/reception of the control message between the execution control module 30 and the resource 10.

For example, JP-A-5-30150 discloses the following technique. When a relay device connected between two communication devices receives a control signal transmitted from one communication device to the other communication device, the relay device controls transfer of the control signal transmitted from the communication device as the transmission source in accordance with the status of the communication device as the transmission destination.

However, this method requires improvement of the managing module, and when the actual condition of the operation is considered, there occurs such a problem that development resource is restricted and backward replacement to past data cannot be secured. Therefore, the job site of the operation is required to carry out the autonomic operation without improving the existing managing module.

However, in many cases, the execution control module and the managing module are not developed on the assumption that they are linked to each other, and it is difficult to associate the instruction message transmitted from the execution module to the managing module with the control message and the response message transmitted/received between the managing module and the resource.

For example, the managing module normally outputs an execution log in which a result of the communication executed with the execution module or the resource is recorded. However, when communications are carried out by plural sessions, the execution log is output with many communication results mixed, and thus it is very difficult for the managing module to analyze the execution log and associate the instruction message with the control message and the response message.

Therefore, when abnormality occurs in a network due to failure or the like and as a result no response message is transmitted from the managing module in response to an instruction message transmitted from the execution control module, the managing module cannot quickly identify the instruction message concerned based on the control message which the managing module receives/transmits. Therefore, there is a problem since an extremely long amount of time is required for a manager to identify a cause inducing a communication error.

Accordingly, it is remarkably important to have a technique for indicating how a cause inducing a communication error is effectively specified without having to improve the managing module.

Preferred embodiments of a communication error information output program, method and device according to the present invention will be described hereunder in detail with reference to the accompanying drawings. In these embodiments, the disclosed device and method are exemplarily applied to an IT resource control device for controlling a resource of the IT system by autonomic operation.

First, a summary and a construction of an IT resource control device according to an embodiment will be described. FIG. 1 is a diagram showing a summary and construction of an IT resource control device according to an embodiment. As shown in FIG. 1, the IT resource control device 100 controls control target resources $110_1$ to $110_3$ by autonomic operation, and includes managing modules $120_1$ to $120_3$, execution control modules 130 and communication data obtaining units $140_1$ to $140_3$.

In the IT resource control device 100, the managing module $120_1$ to $120_3$ and the execution control module 130 have similar functions as the managing module 20 and the execution control module 30 shown in FIG. 14. However, the IT resource control device 100 is different from the IT system shown in FIG. 14 in that the IT resource control device 100 has communication data obtaining units $140_1$ to $140_3$. The respective functional portions of the IT resource control device 100 will be described hereunder.

The managing modules $120_1$ to $120_3$ are processors for transmitting various kinds of control message(s) to the control target resources $110_1$ to $110_3$ to obtain information, renew settings, etc. As shown in FIG. 1, when the managing modules $120_1$ to $120_3$ communicate with the execution control module 130 or the control target resources $110_1$ to $110_3$, the managing modules $120_1$ to $120_3$ output execution logs $121_1$ to $121_3$ in which communication data transmitted/received through a communication concerned are recorded.

FIGS. 2A and 2B are diagrams showing an example of the execution logs $121_1$ to $121_3$ output from the managing modules $120_1$ to $120_3$ according to an embodiment. The execution logs shown in FIGS. 2A and 26 are output from different managing modules. Although a few managing modules are illustrated in FIG. 1, the disclosed invention is not limited to any particular number of managing modules or corresponding elements thereof.

As shown in FIGS. 2A and 2B, the execution log comprises "No." representing a sequence number of every communication data, "time" representing a time at which the communication data are transmitted, "session" (session ID or identifier) for identifying a session from which the communication data are transmitted, "transmission source" representing a device as a transmission source of the communication data, "destination" representing a device as a transmission destination of the communication data, "protocol" representing a protocol used for the transmission of the communication data, "control content" representing a type of the communication data, and "parameter" representing a parameter value set in the communication data.

The execution log shown in FIG. 2A is output from the managing module A (for example, such as managing modules $120_1$ to $120_3$ shown in FIG. 1). In this execution log are recorded an instruction message (communication data of No.=1) transmitted from the execution control module 130 to the managing module A, a control message (communication data of No.=2 to 7) which is bidirectionally delivered between the managing module A and the control target source based on the instruction message concerned, and a failure message (response message representing that a processing based on the instruction message cannot be executed normally) transmitted from the managing module A to the execution control module 130.

Furthermore, the execution log shown in FIG. 2B is output from the managing module B (for example, such as managing modules $120_1$ to $120_3$ shown in FIG. 1). In the execution log B are recorded an instruction message (communication data of No.=1) transmitted from the execution control module 130 to the managing module B, a control message (communication data of No.=2 to 8) which is bidirectionally delivered between the managing module B and the control target resource based on the instruction message concerned, and a success message (a response message representing that a processing based on the instruction message is performed normally; communication data of No.=9) transmitted from the managing module B to the execution control module 130.

The execution logs shown in FIGS. 2A and 2B indicate only sessions whose session IDs are "SS1" and "SS2", however, communication data associated with communications executed by plural sessions are mixed and recorded in the execution logs $121_1$ to $121_3$.

Returning to FIG. 1, the execution control module 130 is a processor for transmitting various kinds of control messages to the managing modules $120_1$ to $120_3$, thereby operating the plural managing modules $120_1$ to $120_3$ in cooperation with each other based on the operation managing procedure 1 defining the procedure of the operation management.

Each of the communication data obtaining units $140_1$ to $140_3$ is a processor for outputting information associated with a cause of a communication error occurring in a communication between the execution control module 130 and the managing modules $120_1$ to $120_3$, or in the communication between the managing modules $120_1$ to $120_3$ and the control target resources $110_1$ to $110_3$ based on the execution log $121_1$ output from the managing module $120_1$. These communication data obtaining units $140_1$ to $140_3$ have the same construction, and in the following description, the communication data obtaining unit $140_1$ is representatively exemplified.

As shown in FIG. 1, the communication data obtaining unit $140_1$ has a communication pattern repository $141_1$ and a log analyzer $142_1$ (the communication obtaining unit $140_2$ has a communication pattern repository $141_2$ and a log analyzer $142_2$, and the communication data obtaining unit $140_3$ has a communication pattern repository $141_3$ and a log analyzer $142_3$). The respective functional portions of the communication data obtaining unit $140_1$ will be described.

The communication pattern repository $141_1$ is a storage unit for storing, every instruction message, a communication pattern associating a pair of an instruction message transmitted from the execution control module 130 to the managing module $120_1$ and a control message which is delivered between the managing module $120_1$ and the control target resource $110_1$ based on the instruction message.

FIGS. 3A and 3B are diagrams showing an example of a communication pattern repository $141_1$ according to an embodiment. As shown in FIG. 3, the communication pattern repository $141_1$ may store "No.", "transmission source", "destination", "protocol", "control content" and "parameter" in association with items of communication data recorded in the execution log $121_1$. The communication pattern repositories shown in FIGS. 3A and 3B represent communication pattern repositories of the managing modules A and B for outputting the execution log shown in FIG. 2.

As described above, when all the processing executed based on the instruction messages transmitted from the execution control module 130 are completed normally, the communication pattern repository $141_1$ stores a set of all control messages delivered between the managing module $120_1$ and the control target resource $110_1$ as a result of the above discussed processing while the control messages are associated with the instruction messages concerned.

The log analyzer $142_1$ is a processor for specifying a cause of a communication error based on the execution log $121_1$ output from the managing module $120_1$ and the communication pattern repository $141_1$, and outputting a log analysis result $143_1$ containing information associated with a specified cause of a communication error.

Specifically, the log analyzer $142_1$ obtains the execution log $121_1$ having a communication message recorded therein, the communication message being delivered between the managing module $120_1$ and the control target resource $110_1$ in response to an instruction message transmitted from the execution control module 130 to the managing module $120_1$, and divides the communication data recorded in the obtained execution log $121_1$ by every session.

Subsequently, the log analyzer $142_1$ compares the execution log $121_1$ divided by every session with a communication pattern stored in the communication pattern repository $141_1$ to judge whether an abnormality occurs in the communication executed between the execution control module 130 and the managing modules $120_1$ to $120_3$ or in the communication executed between the managing modules $120_1$ to $120_3$ and the control target resources $110_1$ to $110_3$.

Here, when the log analyzer $142_1$ judges occurrence of an abnormality, the log analyzer $142_1$ specifies a communication data causing the abnormality, that is, the communication data which is not normally transmitted/received. Then, the log analyzer $142_1$ generates and outputs a log analysis result $143_1$ containing information associated with the specified communication data (the log analyzer $142_2$ outputs a log analysis result $143_2$ and the log analyzer $142_3$ outputs a log analysis result $143_3$).

Next, a processing flow of the log analyzer $142_1$ described above will be described in detail. FIG. 4 is a flowchart showing a processing flow of the log analyzer $142_1$ according to an embodiment. As shown in FIG. 4, the log analyzer $142_1$ reads the execution log $121_1$ (operation S101), carves the read-in execution log $121_1$ on a session by session basis, and stores information read as a session-based execution log, for example, into an inner memory (operation S102).

Subsequently, the log analyzer $142_1$ reads out one execution log from the session-based execution logs stored in the inner memory (operation S103). Here, the log analyzer $142_1$ finishes the processing if there is no execution log to be read out (operation S104, No).

When there is an execution log to be read out (operation S104, Yes), the log analyzer $142_1$ reads out communication data of one line from the execution log concerned (operation S105). Here, when a terminal of the execution log has not yet read out (operation S106, No), the log analyzer $142$; searches a communication pattern containing a message coincident with the communication data concerned from the communication patterns stored in the communication pattern repository $141_1$ (operation S107).

At this time, when the communication data concerned is the communication data of a first line of the execution log, the log analyzer $142_1$ searches the communication pattern from the message stored in the communication pattern repository $141_1$ as described above. However, when the communication data concerned is the communication of a second or subsequent line, the log analyzer $142_1$ searches the communication pattern from coincident patterns stored in the inner memory in operation S109 as described later.

If there is the communication pattern containing the message coincident with the communication data concerned (operation S108, Yes), the log analyzer $142_1$ stores the communication pattern concerned as a coincident pattern into the inner memory (operation S109).

Here, when storing a communication pattern as a coincident pattern, the log analyzer $142_1$ provides a flag to each message contained in the communication pattern, and with respect to a message which is confirmed to be coincident with the communication data read out from the execution log, the log analyzer $142_1$ checks the flag thereof. Thereafter, the log analyzer $142_1$ returns to operation S105 to read out the next communication data from the execution log and repeat the above processing.

On the other hand, if there is no communication pattern containing the message coincident with the communication data concerned (operation S108, No), the log analyzer $142_1$ judges that the communication data concerned exhibits an abnormality, executes a processing for specifying a cause place (location) of the communication error (operation S112), and then outputs an identification result of each session as "abnormal" (operation S113) as the judgment result. The processing for specifying a cause place (location) is described in detail below.

When the log analyzer $142_1$ detects the terminal of the execution log when reading out communication data of one line from the execution log (operation S106, Yes), it executes normal/abnormal judging processing every session whether the processing is normally finished or not (operation S110). This normal/abnormal judging processing is described in detail below.

When abnormality is judged or determined as a result of the normal/abnormal judging processing (operation S111, Yes), the log analyzer $142_1$ executes the cause place specifying processing (operation S112), and then outputs the judgment result of each session as "abnormal" (operation S113).

If normality is judged as a result of the normal/abnormal judging processing (operation S111, No), the log analyzer $142_1$ outputs a judgment result of each session as "normal" without requiring execution of the cause place specifying processing (operation S113).

Next, a processing procedure of a normal/abnormal judging processing shown in FIG. 4 will be described. FIG. 5 is a flowchart showing a processing flow of a normal/abnormal judging processing shown in FIG. 4. As shown in FIG. 5, the log analyzer $142_1$ reads out one communication pattern from the coincident patterns stored in the inner memory in the normal/abnormal judging processing (operation S201).

Here, if the log analyzer $142_1$ reads in the communication pattern from the coincident patterns (operation S202, Yes), the log analyzer $142_1$ checks whether flags of all the messages contained in the communication pattern concerned are checked, and if all the flags are not checked (operation S203, No), the log analyzer $142_1$ registers the communication pattern concerned as a non-completed pattern (operation 204). On the other hand, if all the flags are checked (operation S203, Yes), the log analyzer $142_1$ sets a judgment result of the session as "normal" (operation S205).

Furthermore, if the log analyzer $142_1$ cannot read a communication pattern when reading from the coincident patterns stored in the inner memory (operation S202, No), the log analyzer $142_1$ outputs the non-completed pattern registered at that time into the inner memory (operation S206), and sets the judgment result of the session to "abnormal" (operation S207).

Next, a processing flow of a cause place specifying processing shown in FIG. 4 will be described.

FIG. 6 is a flowchart showing a processing flow of a cause place specifying processing shown in FIG. 4. As shown in FIG. 6, the log analyzer $142_1$ reads the non-completed pattern stored in the inner memory and the session-based execution log in the cause place specifying processing (operation S301).

Subsequently, the log analyzer $142_1$ compares the read-in execution log and non-completed pattern with each other, and extracts first communication data which is not coincident with the message contained in the non-completed pattern in the execution log (operation S302). Here, for example, assuming that the execution log is the execution log shown in FIG. 2A and the non-completed pattern is the communication pattern shown in FIG. 3A, the log analyzer $142_1$ compares the logs and extracts the communication data of No.=7 of the execution log shown in FIG. 2A.

Then, the log analyzer $142_1$ specifies a transmission source based on the extracted communication data (operation S303), and generates and outputs a log analysis result $143_1$ containing information associated with the transmission source and the communication data as the difference (operation S304).

As described above, the instruction message addressed from the execution control module 130 to the managing modules $120_1$ to $120_3$ and the control message delivered between the managing modules $120_1$ to $120_3$ and the control target resources $110_1$ to $110_3$ can be easily associated with each other, and a cause inducing a communication error can be efficiently specified without having to improve the managing modules $120_1$ to $120_3$.

Furthermore, in an embodiment, the control message which cannot be transmitted and the managing modules $120_1$ to $120_3$ or the control target resources $110_1$ to $110_3$ which cannot transmit the control message can be specified, and thus the device causing the communication error can be specified.

In the embodiment described above, the communication data obtaining units $140_1$ to $140_3$ obtain the execution logs $121_1$ to $121_3$ output from the managing modules $120_1$ to $120_3$ respectively, and a cause inducing a communication error is specified every managing module. However, by checking an execution log output from each managing module in a cross-sectoral manner, a cause of a communication error may be specified by considering a correlation or a causal relation between a processing executed by the respective managing modules.

An embodiment using this specifying method (process) will be described hereafter. In the following description, units playing the same roles as the respective parts shown in FIG. 2 are represented by the same reference numerals, and the detailed description thereof is omitted.

Figure 7:
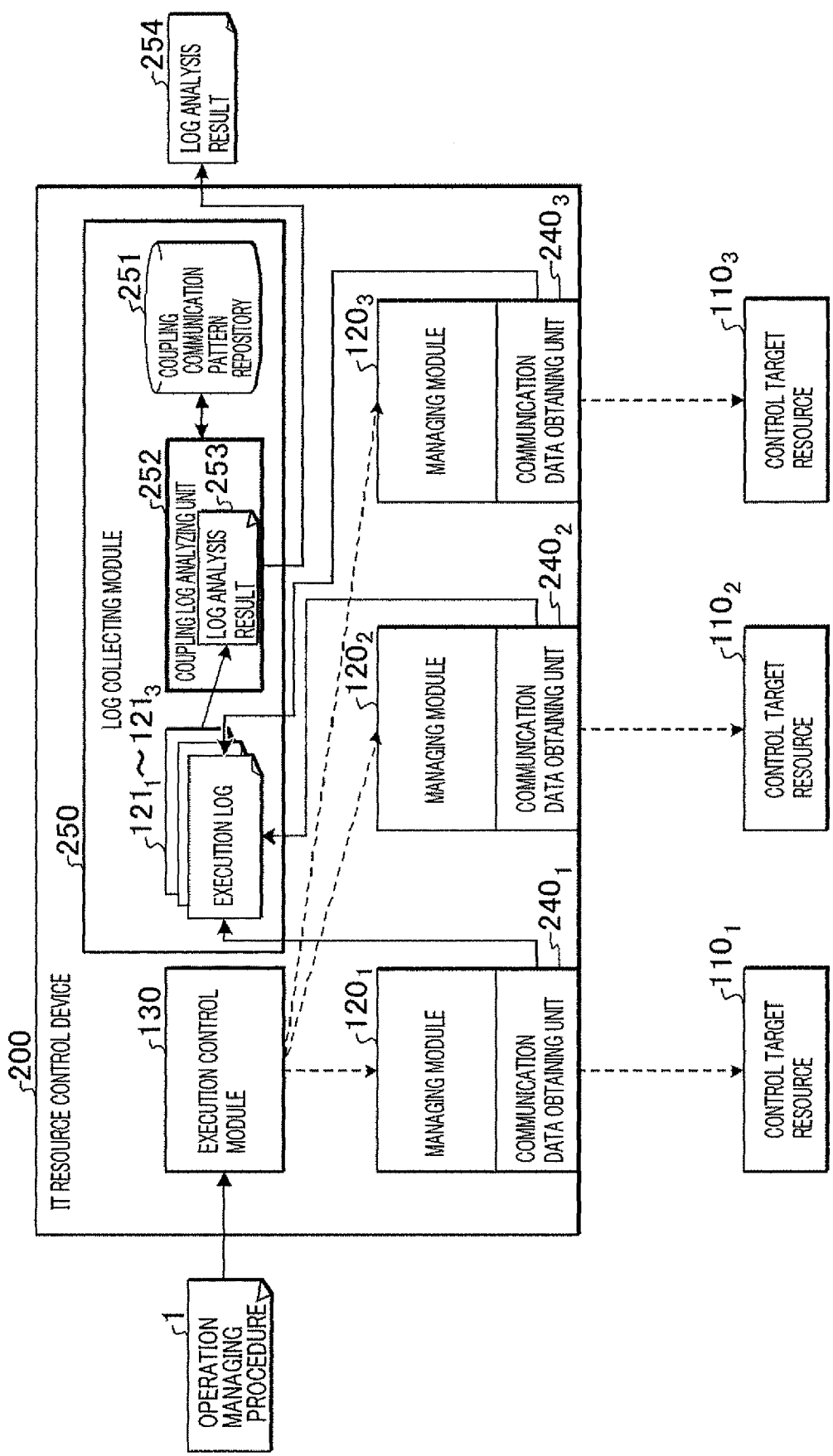
FIG. 7 is a diagram illustrating a summary and construction of an IT resource control device.

First, a summary and construction of an IT resource control device according to an embodiment will be described. FIG. 7 is a diagram showing a summary and construction of an IT resource control device according to an embodiment. As shown in FIG. 7, the IT resource control device 200 controls the control target resources $110_1$ to $110_3$ by an autonomic operation, and the IT resource control device 200 includes managing modules $120_1$ to $120_3$, an execution control module 130, communication data obtaining units $240_1$ to $240_3$ and a log collecting module 250.

In the IT resource control device 200 according to an embodiment, the managing modules $120_1$ to $120_3$ and the execution control module 130 have the same functions as the managing module 20 and the execution control module 30 shown in FIG. 14, however, the IT resource control device 200 is different from the IT system shown in FIG. 14 in that it has the communication data obtaining units $240_1$ to $240_3$ and the log collecting module 250.

The communication data obtaining units $240_1$ to $240_3$ are processors for obtaining the execution logs $121_1$ to $121_3$ output from the managing modules $120_1$ to $120_3$ and outputting the execution logs to the log collection module 250.

The log collecting module 250 is a processor for outputting information associated with a communication error occurring in a communication executed between the execution control module 130 and the managing modules $120_1$ to $120_3$ or in the communication executed between the managing modules $120_1$ to $120_3$ and the control target resources $110_1$ to $110_3$ based on the execution logs $121_1$ to $121_3$ output from the communication data obtaining units $240_1$ to $240_3$.

As shown in FIG. 7, the log collecting module 250 has a coupling communication pattern repository 251 and a coupling log analyzer 252. The respective units of the log collecting module 250 will be described hereafter.

The coupling communication pattern repository 251 is a storage unit for storing, every instruction message, a communication pattern associating a pair of an instruction message transmitted form the execution control module 130 to the managing modules $120_1$ to $120_3$ and a control message delivered between the managing modules $120_1$ to $120_3$ and the control target resources $110_1$ to $110_3$ based on the instruction message concerned.

FIG. 8 is a diagram showing an example of a coupling communication pattern repository 251 according to an embodiment. As shown in FIG. 8, the coupling communication pattern repository 251 stores "No.", "transmission source", "destination", "protocol", "control content" and "parameter" in association with items of a communication data recorded in the execution log $121_1$. The coupling communication pattern repositories shown in FIGS. 8A and 8B represent coupling communication pattern repositories of the managing modules A and B for outputting the execution logs shown in FIGS. 2A and 2B, respectively.

Here, the coupling communication pattern repository 251 is the same as the communication pattern repositories $141_1$ to $141_3$ (see FIG. 3) described with reference to the above-described embodiment in which the above items are stored, however, the coupling communication pattern repository 251 stores the items in association with "restriction and influence to other processes" of every control message. Here, the "restriction and influence on other processes" is information representing influence of transmission of a control message concerned on transmission of other control messages.

For example, in the "restriction and the influence on other processes" are set data including information representing that exclusive input is indispensable (see the control message of No.=1 shown in FIG. 8A), information representing that other processes using the resource concerned forcedly fail (see the control message of No.=6 shown in FIG. 8A), information indicating failure when a user as a processing target has already logged in (see the control message of No.=6 shown in FIG. 8B), etc. Nothing is set in the "restriction and influence on other processes" when there is no influence on the transmission of the other control messages.

Returning to FIG. 7, the coupling log analyzer 252 is a processor for specifying a cause of a communication error based on the execution logs $121_1$ to $121_3$ output from the communication data obtaining units $240_1$ to $240_3$ and the coupling communication pattern repository 251, and outputting a log analysis result 254 containing the information associated with the specified cause of the communication error.

Specifically, the coupling log analyzer 252 collects the execution logs $121_1$ to $121_3$ output from the communication data obtaining units $240_1$ to $240_3$ and couples the collected execution logs $121_1$ to $121_3$ to generate a coupling log (log analysis result) 253. FIG. 9 is a diagram showing an example of the coupling log 253 according to an embodiment. FIG. 9 shows the coupling log 253 when the execution logs shown in FIGS. 2A and 2B are coupled to each other.

The communication data of No.=1 to 7, 16 and 17 are communication data contained in the execution log shown in FIG. 2B, and the communication data of No.=8 to 15 are communication data contained in the execution log shown in FIG. 2A.

The coupling log analyzer 252 not only generates the coupling log 253, but also divides the execution logs $121_1$ to $121_3$ output from the communication data obtaining units $240_1$ to $240_3$ in association with every managing module or every session.

Subsequently, the coupling log analyzer 252 compares the execution logs $121_1$ to $121_3$ divided by every managing module and every session with the communication pattern stored in the coupling communication pattern repository 251, whereby the coupling log analyzer 252 judges whether an abnormality occurs in the communication executed between the execution control module 130 and the managing modules $120_1$ to $120_3$ or in the communication executed between the managing modules $120_1$ to $120_3$ and the control target resources $110_1$ to $110_3$ as in the case of the log analyzers $142_1$ to $142_3$ in the embodiment described above. If it is judged that abnormality occurs, the coupling log analyzer 252 specifies the communication data causing the abnormality, that is, the communication data which are not normally transmitted/received.

Here, the coupling log analyzer 252 checks, based on the coupling log 253 and the communication pattern stored in the coupling communication pattern repository 251, whether there exist other communication data influencing the communication data specified as being abnormal.

When there exist the information associated with the communication data causing the abnormality and further the communication data influencing the communication data concerned, the coupling log analyzer 252 generates and outputs the log analysis result 254 containing the information associated with the communication data.

Figure 10:
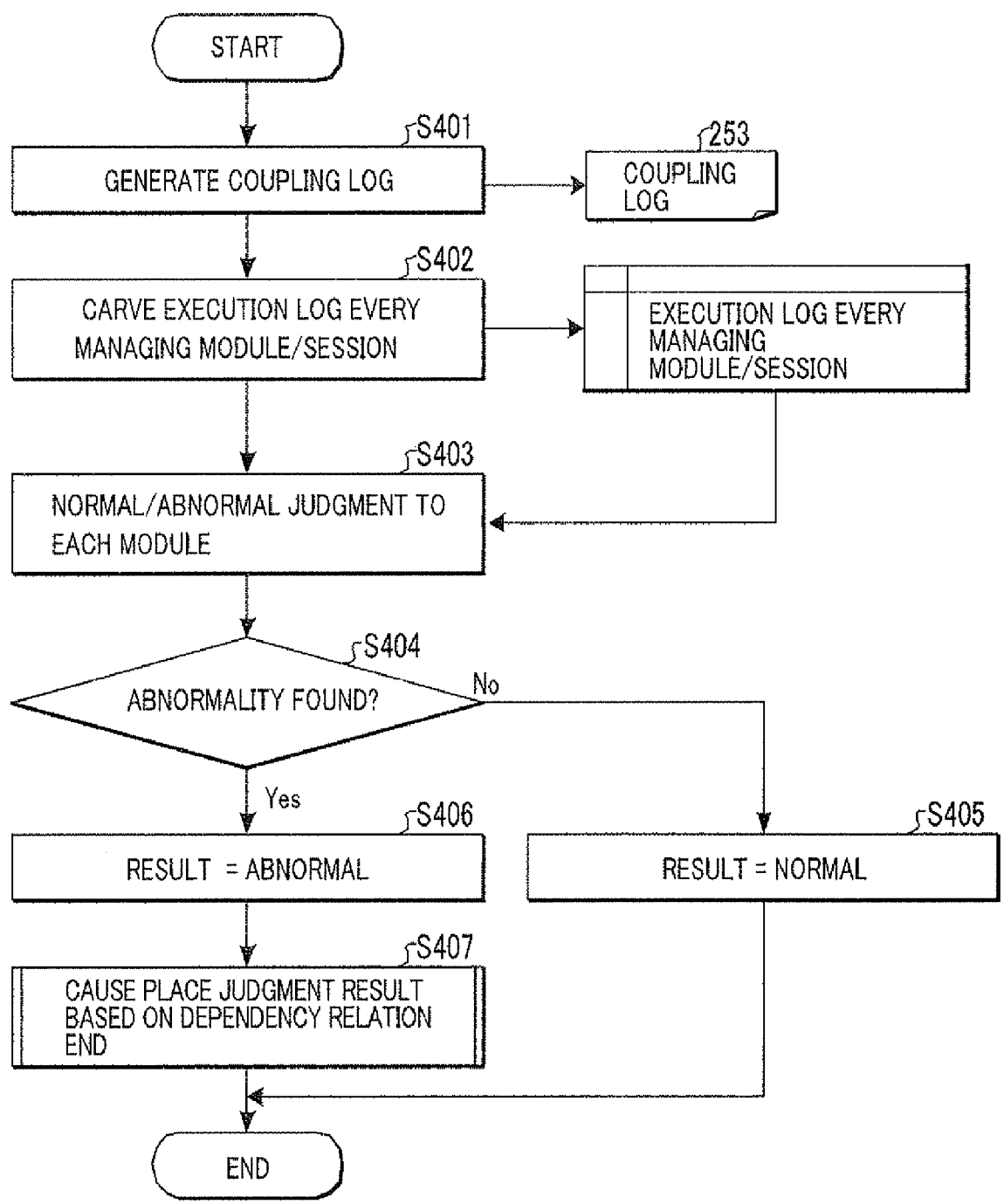
FIG. 10 is a flowchart illustrating a processing flow of a coupling log analyzer.

Next, the processing flow of the coupling log analyzer 252 described above will be described in detail. FIG. 10 is a flowchart showing a processing flow of the coupling log analyzer 252 according to an embodiment. As shown in FIG. 10, the coupling log analyzer 252 generates the coupling log 253 based on the execution logs $121_1$ to $121_3$ (operation S401), carves the execution logs $121_1$ to $121_3$ by every managing module and every session and stores content thereof as the managing module/session based execution log into the inner memory (operation S402).

Subsequently, based on the managing module/session based execution log stored in the inner memory and the coupling communication pattern repository 251, the coupling log analyzer 252 judges whether an abnormality occurs in the communication executed between the execution control module 130 and the managing modules $120_1$ to $120_3$ or in the communication executed between the managing modules $120_1$ to $120_3$ and the control target resources $110_1$ to $110_3$ as in the case of the log analyzers $142_1$ to $142_3$ described in the above described embodiment (operation S403).

Here, when no abnormality occurs (operation S404, No), the coupling log analyzer 252 sets the judgment result to "normal" (operation S405), and finishes the processing. On the other hand, when an abnormality occurs (operation S404, Yes), the coupling log analyzer 252 sets the judgment result to "abnormal" (operation S406), executes the cause place specifying processing based on dependency relation (operation S407), and then finishes the processing. The cause place specifying processing based on this dependency relation will be described hereunder in detail.

Figure 11:
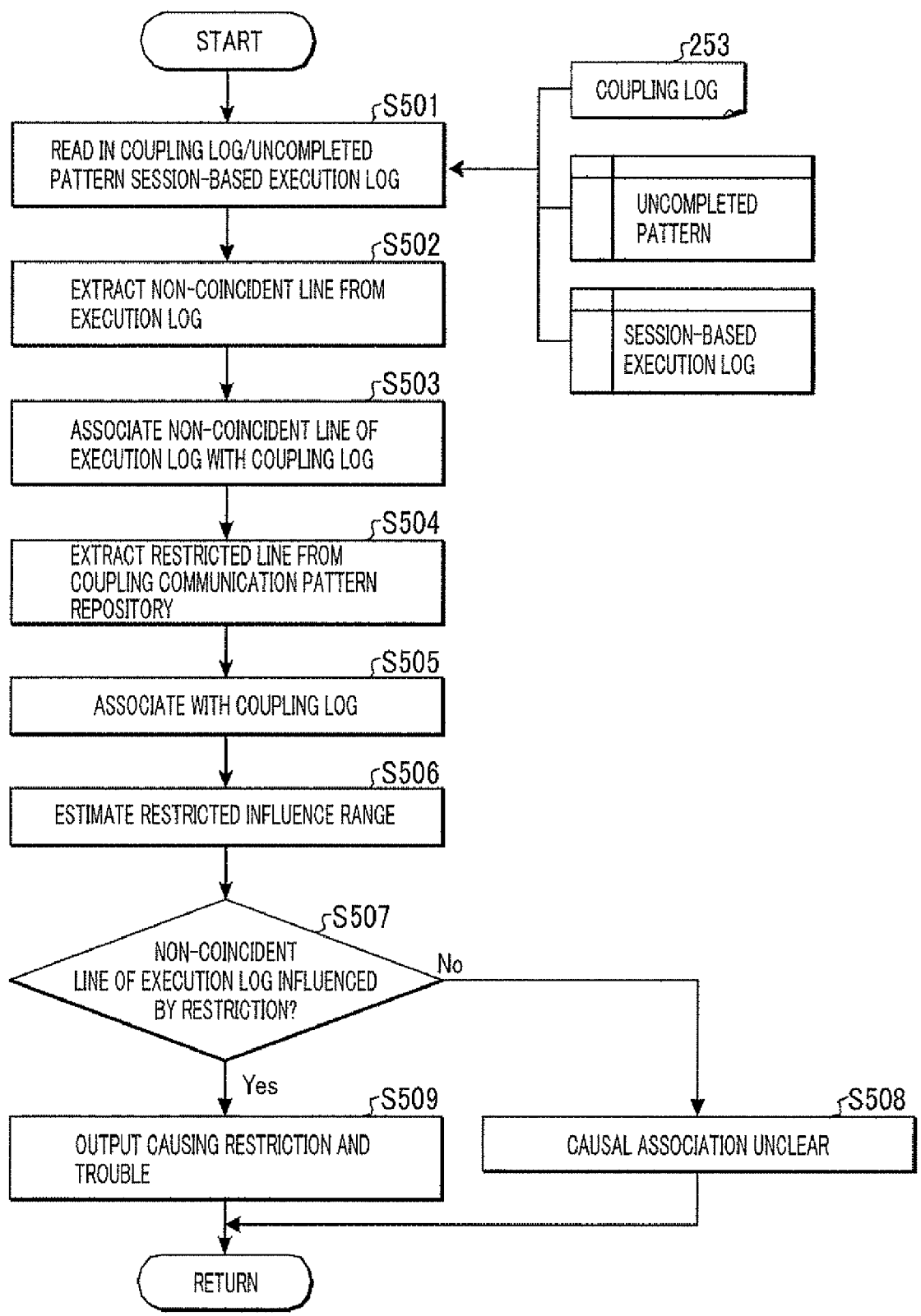
FIG. 11 is a flowchart illustrating a processing flow of causing place identifying processing based on dependency relation shown in FIG. 10.

Next, the processing flow of the cause place specifying processing based on the dependency relation shown in FIG. 10 will be described. FIG. 11 is a flowchart showing a processing flow of a cause place specifying processing based on dependency relation shown in FIG. 10. Furthermore, FIG. 12 is a diagram showing an example of a cause place specifying processing based on a dependency relation. In FIG. 12, the coupling log shown in FIG. 12A is the same as the coupling log shown in FIG. 9, and the coupling communication pattern repository shown in FIG. 12B is the same as the coupling communication pattern repository shown in FIG. 8A.

As shown in FIG. 11, in the cause place specifying processing based on dependency relation, the coupling log analyzer 252 reads in the coupling log 253 and a non-completed pattern and managing module/session based execution log which are stored in the inner memory (operation S501).

Subsequently, the coupling log analyzer 252 extracts the first communication data which is not coincident with the message contained in the non-completed pattern in the execution log in the same procedure as the cause place specifying processing (see FIG. 6) described in the above-described embodiment (operation S502).

Here, for example, assuming that the execution log is the execution log shown in FIG. 2A and the non-completed pattern is the communication pattern shown in FIG. 3A, the coupling log analyzer 252 compares them and extracts the communication data of No.=7 of the execution log shown in FIG. 2A.

The coupling log analyzer 252 associates the extracted communication data with the coupling log 253 (operation S503). Specifically, the coupling log analyzer 252 searches the coupling log 253 based on the extracted communication data and specifies the communication data corresponding to the communication data concerned.

For example, when the coupling log shown in FIG. 12A is used, the coupling log analyzer 252 specifies the communication data shown in (1) of FIG. 12A as the communication data corresponding to the communication data of No.=7 of the execution log of FIG. 2A described in the above example.

Furthermore, the coupling log analyzer 252 extracts from the coupling communication pattern repository 251 all the communication patterns in which values are set in "restriction and influence on other processes" (operation S504), and associates the extracted communication pattern with the coupling log 253 (operation S505). Specifically, the coupling log analyzer 252 searches the coupling log 253 based on the extracted communication pattern, and specifies the communication data coincident with the communication pattern concerned.

For example, when the coupling log shown in FIG. 12A is used, the coupling log analyzer 252 species the communication data shown in (3) of FIG. 12A as the communication pattern shown in (2) of FIG. 12B.

The coupling log analyzer 252 estimates an influence range of the restriction by the communication data specified in operation S505 (operation S506). Specifically, the coupling log analyzer 252 judges whether the communication data specified in operation S503 suffers the influence of the restriction by the communication data specified in operation S505. Here, a method of judging a presence or absence of the influence of the restriction by some communication is assumed to be predetermined in accordance with the type of "restriction and influence on other processes" of the communication pattern corresponding to the communication data concerned.

For example, with respect to the influence range of the restriction by the communication data shown (3) of FIG. 12A, "restriction and influence on other processes" is "other processes using the resource concerned fail enforcedly", and thus the communication data influenced by the restriction of the communication data concerned are communication data transmitted after the communication data having the influence, and further the control target resource as the processing target is the same. Accordingly, in the example shown in FIG. 12, the communication data shown in (1) of FIG. 12A suffers the influence of the restriction by the communication data shown in (3).

As described above, the coupling log analyzer 252 judges whether the communication data specified in operation S503 is influenced by the restriction based on the communication data specified in operation S505. When judging or determining that the communication data is not influenced (operation S507, No), the causal relation of the communication data is judged to be unclear (operation S508).

On the other hand, when judging that the communication data is influenced (operation S507, Yes), the coupling log analyzer 252 indicates data specified in operation S505 as "restriction" and also the communication data specified in operation S503 as "trouble", generates a log analysis result 254 containing the information associated with the respective communication data described above, and outputs the generated log analysis result 254 (operation S509).

As described above, in an embodiment, when the execution control module 130 transmits instruction messages to plural managing modules $120_1$ to $120_3$, the log collecting module 250 collects the execution logs $121_1$ to $121_3$ from the plural managing modules $120_1$ to $120_3$. The execution control module specifies the control message influencing the non-transmitted control message based on the influence information ("restriction and influence on other processes" of the coupling communication pattern repository 251) in which the information associated with the influence of the transmission of the control message on the transmission of the other control messages is stored.

Accordingly, in this embodiment, when a communication error occurs in transmission of some control message, another control message influencing the transmission of the control message concerned can be specified, and the essential cause inducing the communication error can be specified.

Furthermore, in the above embodiments, the IT resource control device has the three managing modules, however, the present invention is not limited to these embodiments, The present invention may be likewise applied to a case where managing modules whose number is less than three or more than three are used.

In the above embodiments, all the managing module, the execution control module, the communication data obtaining unit and the log collecting module are equipped to one IT resource control device. However, the respective processing units may be respectively provided to different devices.

The IT resource control device is described in the embodiment described above, however, a communication error information output program having the same function may be obtained by implementing the construction described above with software. Therefore, a computer executing the communication error information output program will be described.

Figure 13:
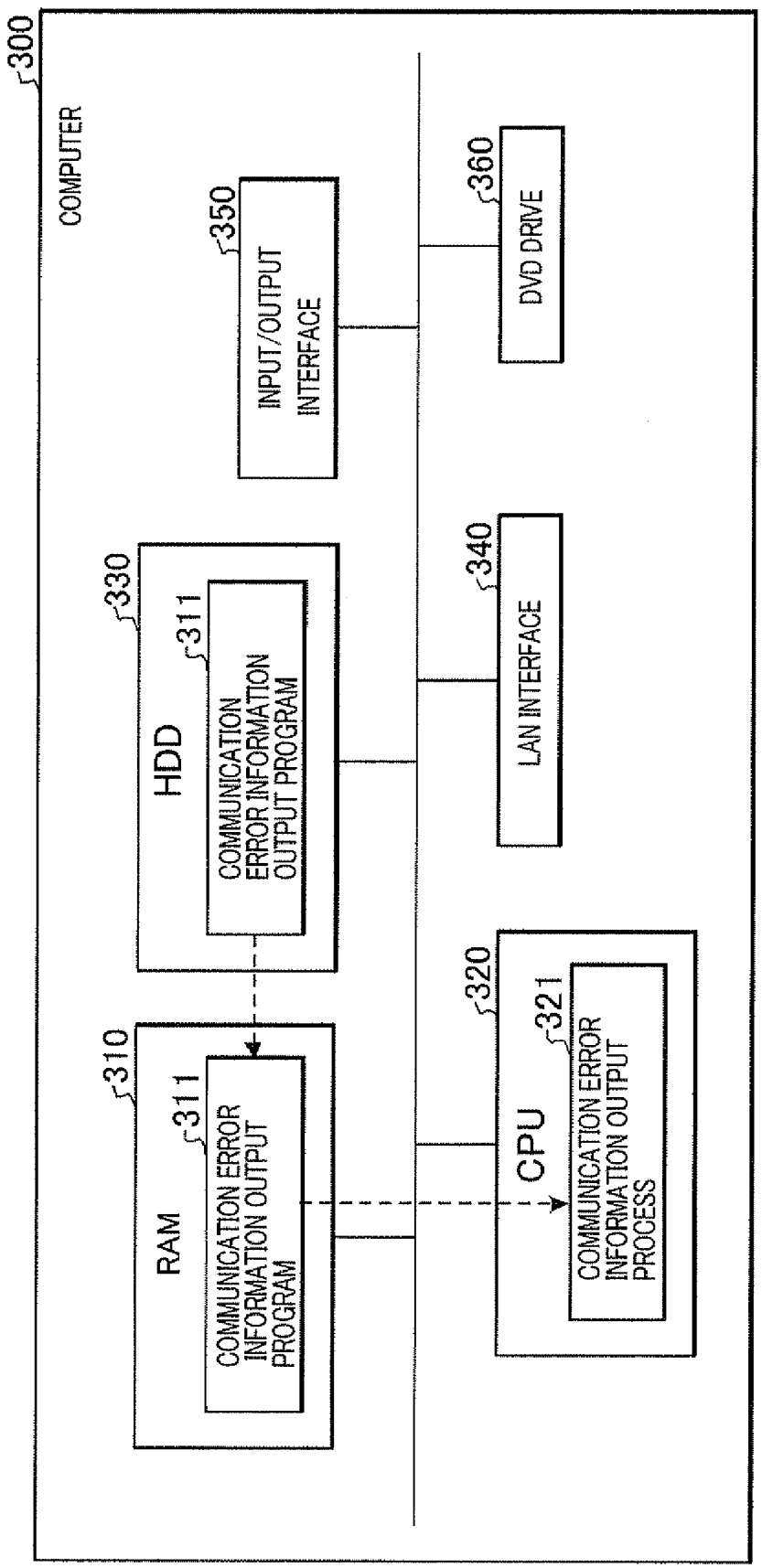
FIG. 13 is a functional block diagram illustrating a construction of a computer executing a communication error information output program.

FIG. 13 is a functional block diagram showing a construction of a computer executing a communication error information output program. As shown in FIG. 13, a computer 300 includes a RAM (Random Access Memory) 310, a CPU (Central Processing Unit) 320, a HDD (Hard Disc Drive) 330, a LAN (Local Area Network) an interface 340, an input/output interface 350, and a DVD (Digital Versatile Disk) drive 360.

RAM 310 is a memory for storing a program or a halfway execution result of the program, and CPU 320 is a central processing unit for reading and executing the program from RAM 310.

HDD 330 is a disc device for storing the program and data, and the LAN interface 340 is an interface for connecting the computer 300 with another computer through LAN.

The input/output interface 350 is an interface for connecting an input device such as a mouse, a keyboard or the like and a display device, and the DVD drive 360 is a device for reading and writing DVD. The communication error information output program 311 to be executed in the computer 300 may be stored in DVD, and read out from the DVD by the DVD drive 360 and installed on the computer 300.

Alternatively, the communication error information output program 311 may be stored in a database or the like of another computer system connected through the LAN interface 340, and read out from the database and installed on the computer 300.

The installed communication error information output program 311 may be stored in HDD 330, read out into RAM 310, and executed as a communication error information output process 321 by CPU 320.

In the above embodiments, all or some of the processing which is described to be automatically executed may be manually executed, or all or some of the processing which is described to be manually executed may be automatically executed by a well-known method.

The information containing the processing flow, the control flow, the specific titles, various kinds of data and parameters which are described or illustrated in the text or drawings may be freely changed if otherwise described.

The respective constituent elements of the respective devices shown in the figures are functionally conceptual, and it is not necessarily required that these elements are physically constructed as illustrated. That is, the specific styles of the dispersion/integration of the respective devices are not limited to those shown in the figures, and all or some of them may be functionally or physically dispersed from or integrated with one another at any unit in accordance with various kinds of loads, using condition, etc.

Furthermore, with respect to the respective processing functions of the respective devices, all or some of them may be implemented by CPU and a program analyzed and executed by the CPU concerned or as hardware based on wired logic.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A computer-readable recording medium having a program recorded therein to cause a computer to execute operations including output processing of information associated with a communication error, the operations comprising:

obtaining a communication log containing a communication message delivered between a second device and a third device in accordance with a control message transmitted from a first device to the second device;

executing a non-transmitted control message specifying procedure for reading out control message association information containing identification information of a control message delivered between the second device and the third device in association with identification information of a control message addressed and transmitted from the first device to the second device, and specifying a non-transmitted control message based on the read-out control message association information and the communication log obtained;

executing a control message information output procedure of outputting information associated with the non-transmitted control message specified in the non-transmitted control message specifying procedure.

2. The computer-readable recording medium according to claim 1, wherein the communication log obtaining procedure collects communication logs from a plurality of second devices when the first device transmits control messages to the plural second devices, and the non-transmitted control message specifying procedure specifies a control message influencing the non-transmitted control message based on influence information containing information associated with an influence of transmission of a control message related to transmission of other control messages.

3. The recording computer-readable medium according to claim 1, wherein the control message association information stores identification information of the control message delivered between the second device and the third device and identification information of the third device in association with identification information of the control message addressed and transmitted from the first device to the second device, and the non-transmitted control message specifying includes reading out the control message association information, and specifies, based on the read-out control message association information and the communication log obtained, a non-transmitted control message which is not transmitted and the second device or third device which cannot transmit any control message.

4. A communication error information output method outputting processing of information associated with a communication error, comprising:

obtaining a communication log containing a communication message delivered between a second device and a third device in accordance with a control message transmitted from a first device to the second device;

executing a non-transmitted control message specifying reading out control message association information containing identification information of a control message delivered between the second device and the third device in association with identification information of a control message addressed and transmitted from the first device to the second device, and specifying a non-transmitted control message based on the read-out control message association information and the communication log obtained; and outputting a control message information including information associated with the non-transmitted control message specified in the non-transmitted control message specifying.

5. The communication error information output method according to claim 4, wherein the communication log obtaining includes collecting communication logs from a plurality of second devices when the first device transmits control messages to the plural second devices, and the non-transmitted control message specifying includes specifying a control message influencing the non-transmitted control message based on influence information containing information associated with an influence of transmission of a control message related to transmission of other control messages.

6. The communication error information output method according to claim 4, wherein the control message association information stores identification information of the control message delivered between the second device and the third device and identification information of the third device in association with identification information of the control message addressed and transmitted from the first device to the second device, and the non-transmitted control message specifying includes reading out the control message association information, and specifies, based on the read-out control message association information and the communication log obtained, a non-transmitted control message which is not transmitted and the second device or third device which cannot transmit any control message.

7. A communication error information output device for outputting information associated with a communication error, comprising:

a communication log obtaining unit obtaining a communication log containing a communication message delivered between a second device and a third device in accordance with a control message transmitted from a first device to the second device;

a non-transmitted control message specifying unit reading out control message association information containing identification information of a control message delivered between the second device and the third device in association with identification information of a control message addressed and transmitted from the first device to the second device, and specifying a non-transmitted control message based on the read-out control message association information and the communication log obtained; and a control message information output unit outputting information associated with the non-transmitted control message specified in the non-transmitted control message specifying unit.

8. The communication error information output device according to claim 7, wherein the communication log obtaining unit collects communication logs from a plurality of second devices when the first device transmits control messages to the plural second devices, and the non-transmitted control message specifying unit specifies a control message influencing the non-transmitted control message based on influence information containing information associated with an influence of transmission of a control message related to transmission of other control messages.

9. The communication error information output device according to claim 7, wherein the control message association information stores identification information of the control message delivered between the second device and the third device and identification information of the third device in association with identification information of the control message addressed and transmitted from the first device to the second device, and the non-transmitted control message specifying unit reads out the control message association information, and specifies, based on the read-out control message association information and the communication log obtained, a non-transmitted control message which is not transmitted and the second device or the third device which cannot transmit any control message.

10. A method of outputting information associated with a communication error, comprising:

associating a control message from a first device to a second device with a message between the second device and a third device;

maintaining a log of each communication message delivered between the second device and the third device based on a message from the first device; and indicating a location of a communication error based on the log and data resulting from said associating.

* * * * *